Nov. 14, 1939.  E. M. FRANKEL ET AL  2,179,782
CONTROL DEVICE FOR BOILERS
Filed Jan. 15, 1938  2 Sheets-Sheet 1
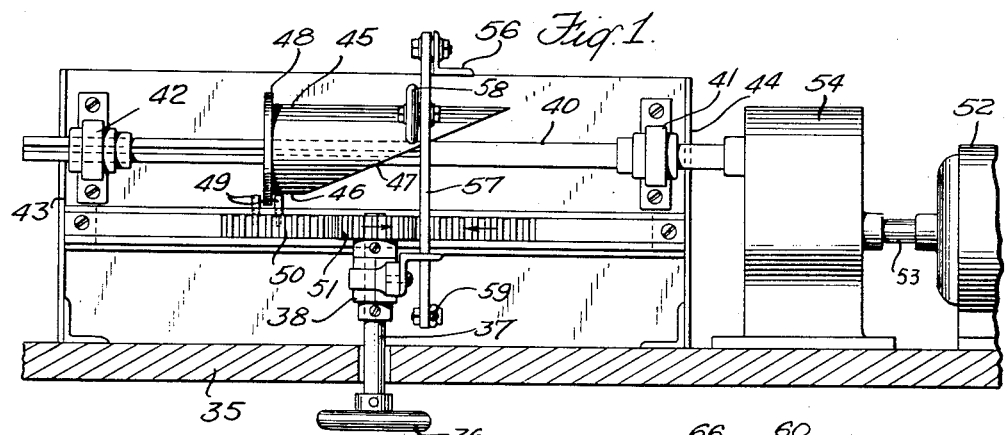
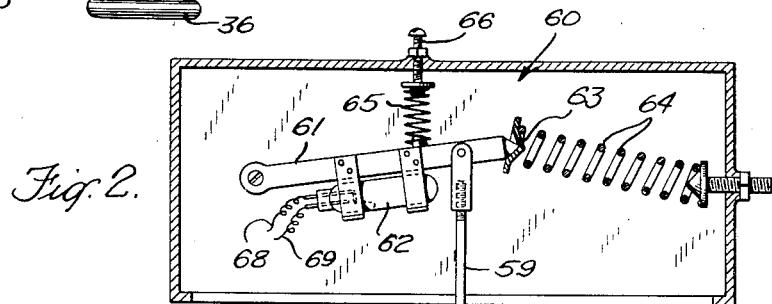
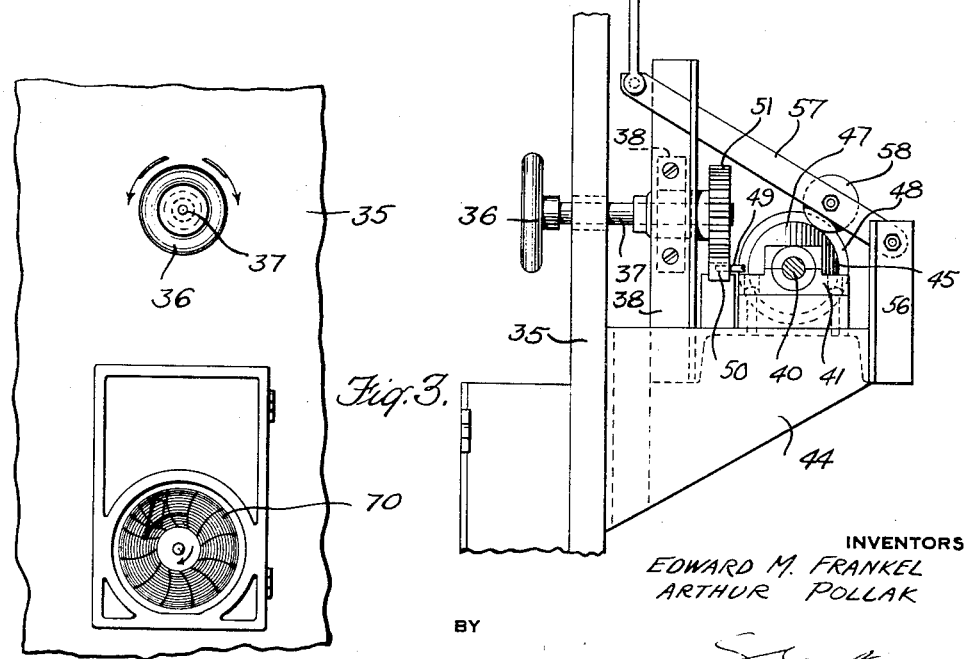
INVENTORS
EDWARD M. FRANKEL
ARTHUR POLLAK
BY
ATTORNEY

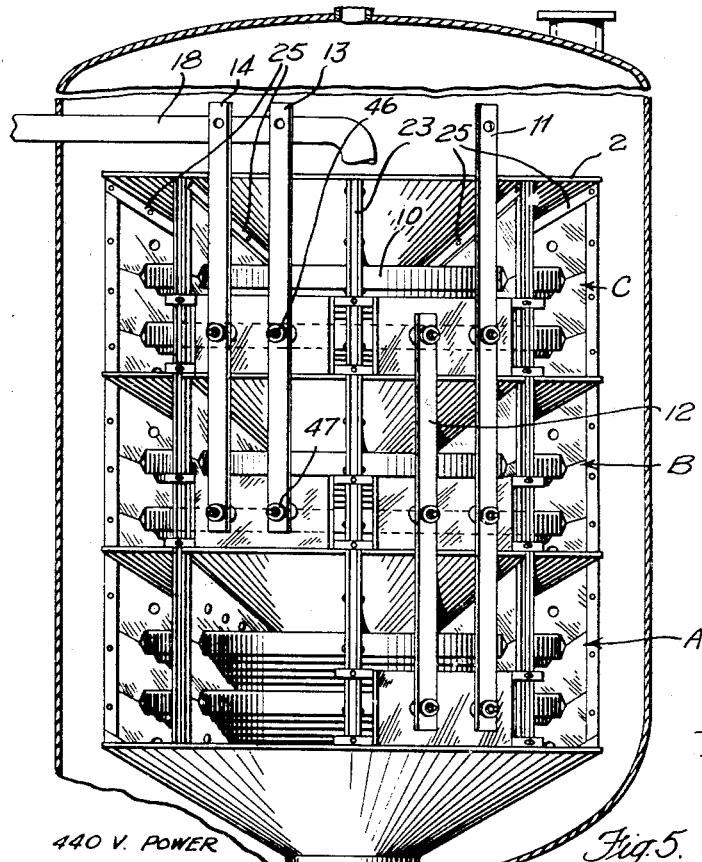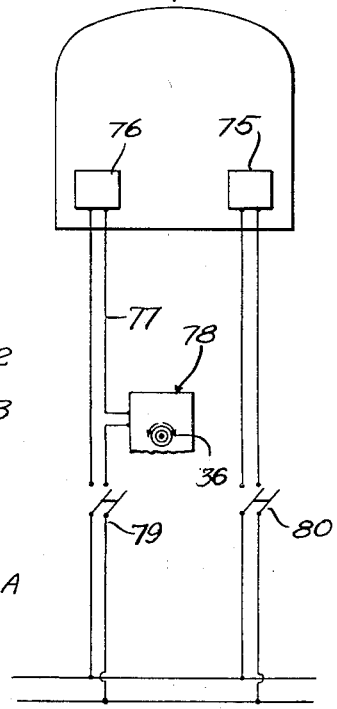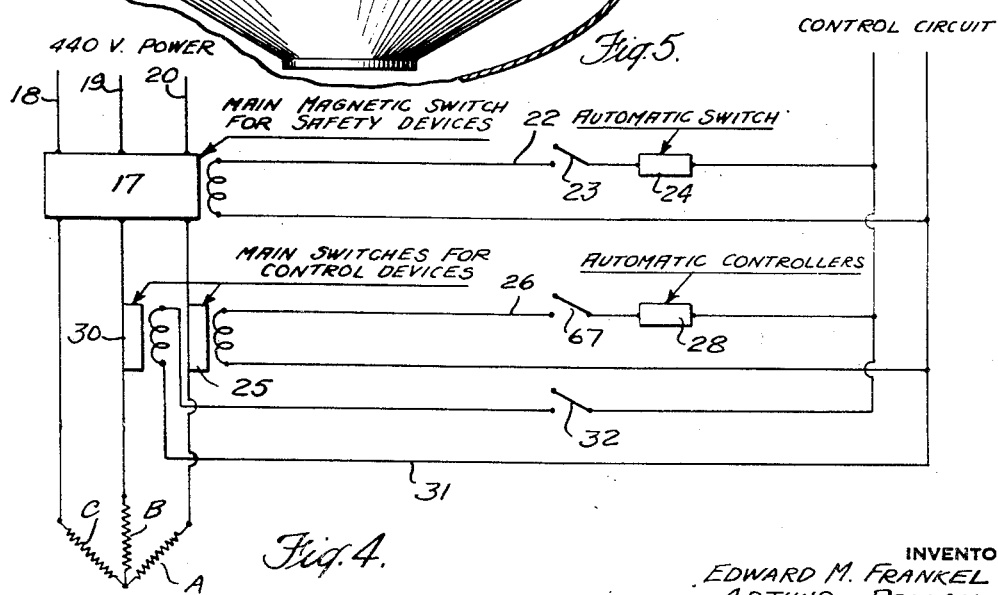

Patented Nov. 14, 1939

2,179,782

UNITED STATES PATENT OFFICE 2,179,782

CONTROL DEVICE FOR BOILERS

Edward M. Frankel, Cedarhurst, Md., and Arthur Pollak, New York, N. Y., assignors to West Virginia Pulp and Paper Company, New York, N. Y., a corporation of Delaware Application January 15, 1938, Serial No. 185,120

3 Claims. (Cl. 219—38)

Our present invention relates to control systems for electric boilers, particularly those adapted for the heating or evaporating of diphenyl or other substances boiling at high temperature. Boilers of this type are useful in heating systems depending upon the supply of a heating vapor as for example that of diphenyl, the vapor of which is circulated through various heating spaces and then returned as liquid to the boiler. Because of the nature of such use it is highly important that the vapor be furnished at a uniform temperature as otherwise the benefit of applying heat by means of a vapor is largely lost.

Our invention is particularly adapted for use in connection with a three-phase power circuit employed as the source of heat, but is not limited thereto.

The principal object of the invention is, therefore, to provide for accurate and automatic control of the heat input to the boiler or heater whereby the heat furnished the system to be heated by means of the vapor can be very accurately controlled.

Still further objects of the invention and various advantages thereof will be apparent as the description proceeds and the novel features will be pointed out in the appended claims.

The invention will be best understood by reference to the following detailed description taken with the annexed drawings, in which Fig. 1 is a plan view of an illustrative embodiment of our improved control device;

Fig. 2 is a view of certain operating mechanisms of said control device;

Fig. 3 is a fragmentary view on a reduced scale as seen from the left of Fig. 2;

Fig. 4 is a diagram of the control circuits for heating elements of the electric type;

Fig. 5 is a view in vertical elevation of the entire electric heating unit to which the invention is applicable;

Fig. 6 shows the invention as applied to oil-burner heating.

Referring to Fig. 5, the heating elements there shown are divided into three circuits, A, B and C, consisting of coils of resistance ribbon 10 and connected by means of conductors 11, 12, 13, 14 for three-phase operation (see also Fig. 4), the specific details of the boiler, with which the present application is not concerned, being disclosed in our co-pending application, Serial No. 70,328, filed March 23, 1936. Three-phase current is supplied to the boiler by means of conductors 18, 19 and 20, such conductors being provided with a magnetically operated switch 17 operated by circuit 22 provided with a manually actuated switch 23 and by an automatic switch 24, responsive to a predetermined maximum of any desired variable, e. g., temperature or pressure. Conductor 20 is additionally provided with a magnetic switch 25 operated by circuit 26 and an automatic switch 28. Similarly, conductor 19 has a magnetic switch 30, circuit 31, and manual switch 32. There is a familiar law governing three-phase circuits that when one leg of the system, as for example the conductor 20, is interrupted, the power input is thereby halved. We have found that the automatic control of such leg of the three-phase system affords a control means of great accuracy. To accomplish this we provide for periodic cutting in and cutting out of the coil A, advantage being taken of the large heat capacity of the boiler and contents to absorb the heat contributed by coil A during the heating period and distribute it during the non-heating period whereby the time-temperature curve in respect to the vapor furnished by the boiler is for all practical purposes a straight line.

To accomplish this control we have devised the following apparatus: 35, Fig. 1, denotes a panel board having an operating wheel 36 attached to a shaft 37 journaled in a bracket 38 attached to the rear of said journal. A shaft 40 is also mounted in the rear of the panel in journals 41 and 42 attached to brackets 43, 44, respectively. Loosely mounted on said shaft but keyed thereto is a cylinder 45 having a non-truncated portion 46, a portion 47 truncated as by an obliquely disposed plane. Cylinder 45 has an end flange 48, engaging which are fingers 49, 49 attached to a slidable rack 50, said rack engaging gear 51 attached to shaft 37. When the wheel 36 is turned, the rack 50, and consequently the cylinder 45, is moved back or forth along the shaft 40. The shaft 40 is driven by an electric motor 52 of constant speed type through shaft 53 and gear reduction box 54. Journaled in support 56 is a lever 57 having a follower 58 which is adapted to follow the curved surface of the roll 45. Attached to the end of lever 57 is link 59 which connects with a switch generally denoted by 60. Switch 60, which is of conventional design, consists of a lever 61 carrying a mercury cell 62, said lever 61 engaging a shield 63 carried by toggle spring 64. In order further to control the movement of lever 61, the same is attached to compression spring 65, the tension of which is regulated by a screw 66. The operation of the control device will now be evident. When the follower 58 is in contact with the curved surface of the roller 45, the switch 60 is in the position shown in Fig. 2, in which the mercury cell connects the leads 68 and 69, thereby actuating the control circuits 26 to cut in the coil A. When, however, the cut-out portion of the cylinder 45 comes in contact with the follower 58, the spring 65 acts to tilt the lever 61 downwardly past dead center of the toggle to the off position. When the cylinder is moved to the right of Fig. 1, by turning the wheel 36 a greater proportion of the curved surface is presented to the follower 58 and the coil A is cut in for a longer time. Should it be desired to keep the coil cut in for an indefinite period, the cylinder 45 is moved until the non-truncated portion 46 is in contact with the follower 58. When the cylinder 45 is moved to the extreme left, Fig. 1, the coil A will be cut out for an indefinite period.

In the normal operation of the device, the operator has before him a recording chart 70, Fig. 3, of whatever variable in the system is desired, i. e., temperature or pressure, which variable is influenced by the operation of the boiler. If the pointer deviates from the desired value, he manipulates the wheel 36 accordingly. Or, the device may be rendered fully automatic in operation by known means not shown.

In Fig. 6 we have indicated diagrammatically the application of our invention to a boiler which is oil or gas fired. Here a burner 75 is provided which is adapted to run continuously, while burner 76 is adapted for intermittent operation. Each burner is controlled through an electric circuit, shown, as is customary in the art, that for burner 76 being denoted 77 and having therein a control device 78, the same as illustrated in Figs. 1, 2 and 3 and the operation of which serves to cut in and out of operation said burner 76. For each circuit there is provided a hand switch 79 and 80, respectively.

While we have described our improved embodiments in considerable detail, it is understood that we have done so by way of example only and that various changes will occur to those skilled in the art without either departing from the spirit of the invention or the scope of the appended claims.

We claim:

1. In a vapor heating system, a boiler, electric heating units therein adapted for three-phase operation and automatic means responsive to the temperature of said system for automatically cutting in and cutting out one leg of the three-phase connections to control the average temperature in the system.

2. In an electric boiler, three electric resistance units, corresponding poles of said units being joined together and corresponding poles being respectively joined to the poles of a three-phase circuit, and automatic means for making and breaking one of said three-phase connections thereby varying the electrical input and controlling the average temperature of the boiler.

3. In an electrical resistance boiler, a plurality of heating units connected for three-phase operation and means for controlling the electrical input to said boiler comprising a device for interrupting one of said three-phase circuits at periodic times and means for varying the duration of each interruption.

EDWARD M. FRANKEL.
ARTHUR POLLAK.